Dec. 11, 1945.     H. FITZ     2,390,932
CASE FOR CAMERAS
Filed Dec. 21, 1940     2 Sheets-Sheet 1
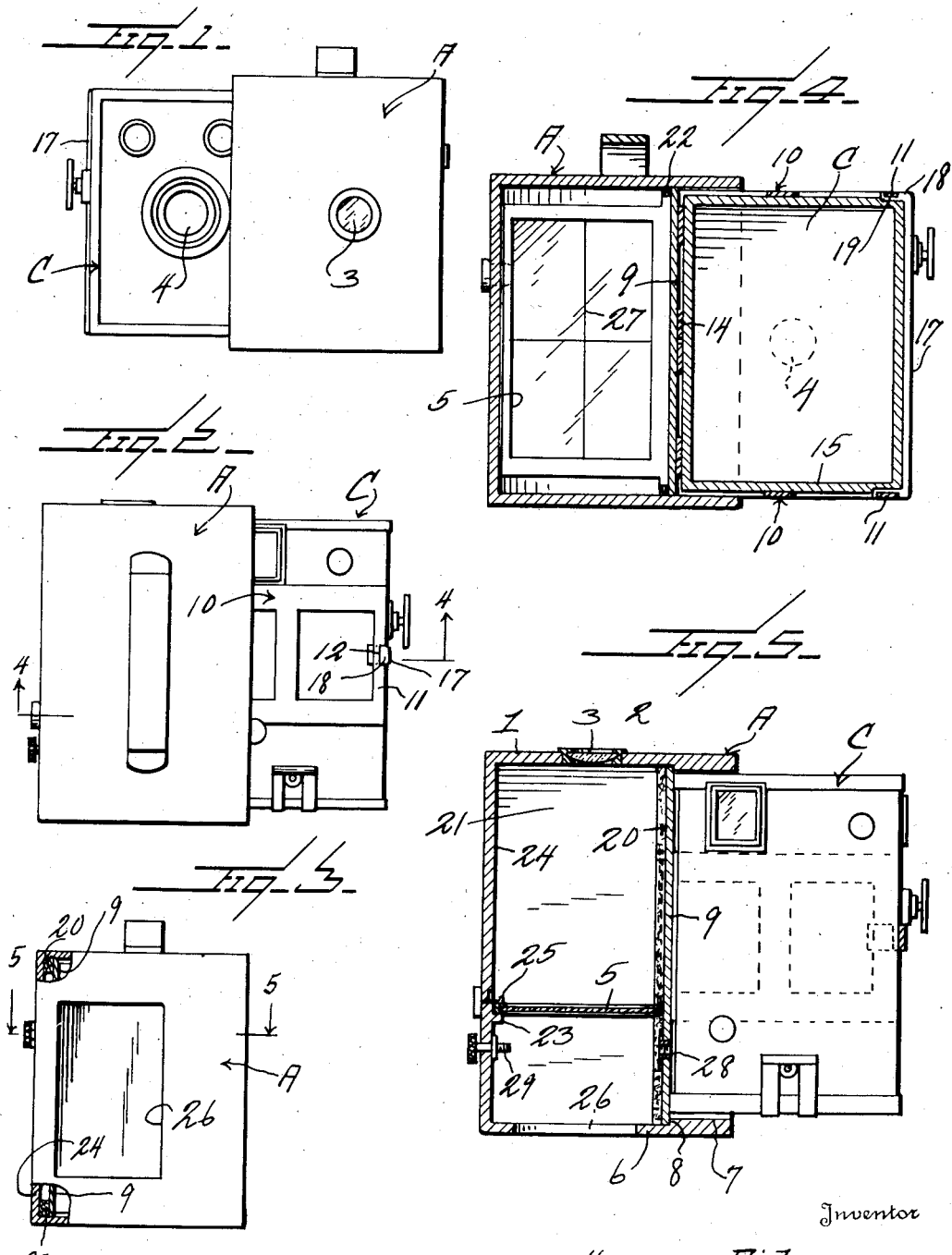
Inventor
Henry Fitz
By Watson E. Coleman
Attorney Dec. 11, 1945. H. FITZ 2,390,932
CASE FOR CAMERAS
Filed Dec. 21, 1940 2 Sheets-Sheet 2
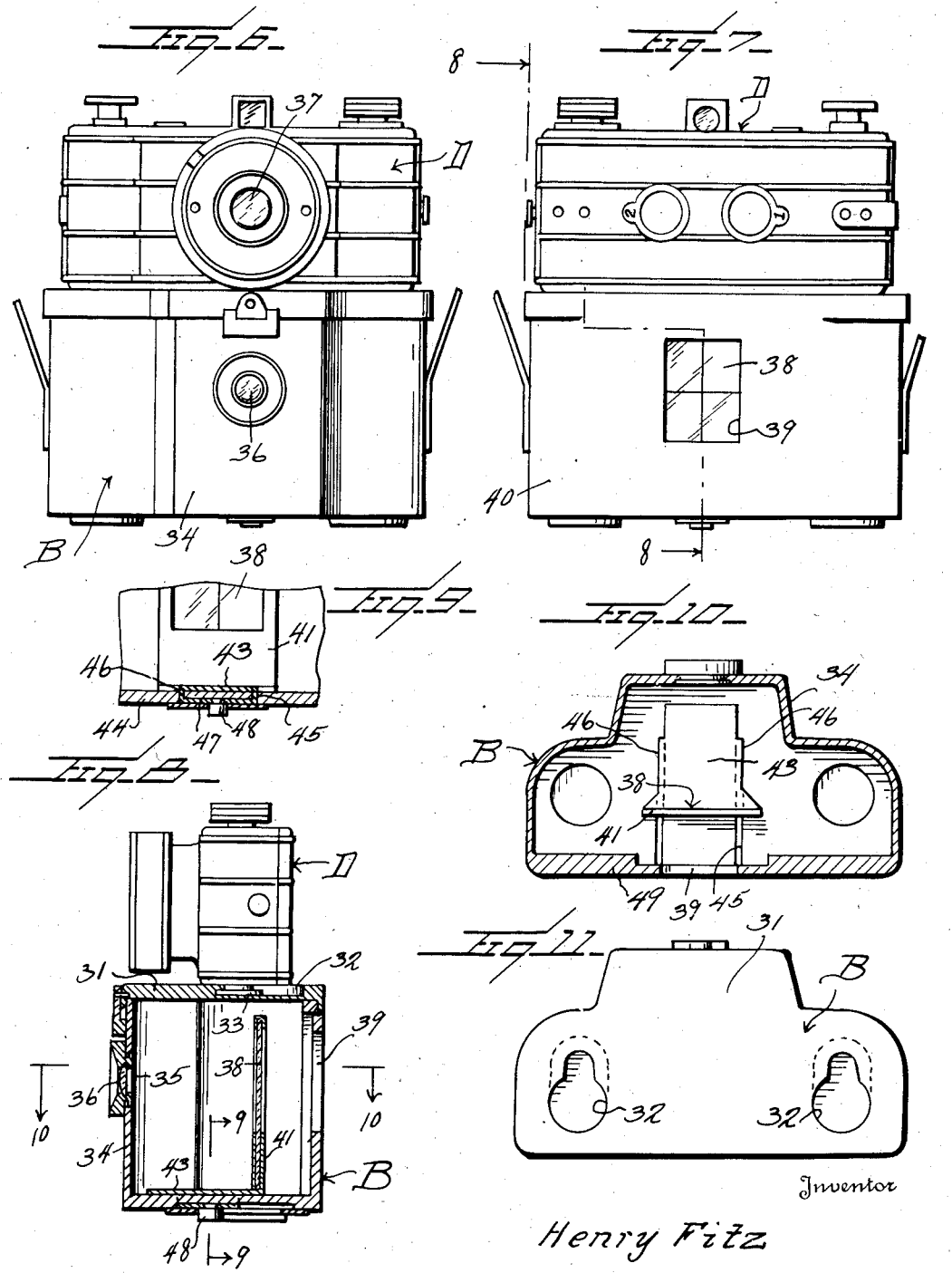
Inventor
Henry Fitz
By Watson E. Coleman
Attorney Patented Dec. 11, 1945

2,390,932

UNITED STATES PATENT OFFICE 2,390,932

CASE FOR CAMERAS

Henry Fitz, Washington, D. C.

Application December 21, 1940, Serial No. 371,191

2 Claims. (Cl. 95—11)

This invention relates to a case for cameras, and it is primarily an object of the invention to provide a device of this kind which may be used as a focus finder and wherein the case is so constructed and arranged to provide means to produce an image in the same focus and of the same size and identity as the image to be produced on the sensitive film or plate of the camera.

It is also an object of the invention to provide a case of this kind having one wall provided with a finder lens and an opposed wall having an opening or window to permit a person to have visual access to the image projected by the lens on a finder screen interposed between the lens and opening or window, said screen being so mounted and arranged within the case to offer no hindrance or obstruction to the housing of the camera within the case when so desired.

Another object of the invention is to provide a case for a camera provided with means whereby an image will be produced on a focusing or finder screen within the case which may be readily observed by an operator, said image produced on the focusing or finder screen being a duplicate as to location and as to all of its detail of the image to be recorded on the sensitized photographic film or kindred element of the camera adapted to be contained within the case when not in use.

A further object of the invention is to provide a case for containing a camera when not in use, said case having means for coaction with the camera when withdrawn for maintaining the camera and case in predetermined relative positions, the case being provided with means whereby, when the camera is withdrawn, there will be produced within the case a focusing image readily visible to the user which will be a duplicate as to location and as to all of its detail of the image that would be formed on the light sensitive film or kindred element within the camera at the instant of opening the lens of the camera.

The invention also contemplates as an object to provide a case for a camera provided with means whereby, when the camera is withdrawn from the case, the case will effectively serve as the finder for the camera irrespective of any angle it may be desired to operate the camera above or below the horizontal.

The invention consists in the details of construction and in the combination and arrangement of the several parts of my improved case for a camera whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in front elevation illustrating a camera case constructed in accordance with an embodiment of my invention with the associated camera withdrawn to a position for use;

Figure 2 is a view in top plan of the case as herein disclosed with the camera withdrawn for use;

Figure 3 is a view in rear elevation with portions broken away of the case as herein disclosed with the camera housed therein;

Figure 4 is an enlarged sectional view taken substantially on the line 4—4 of Figure 2;

Figure 5 is an enlarged sectional view taken substantially on the line 5—5 of Figure 3 with the camera withdrawn for use;

Figure 6 is a view in front elevation illustrating a case constructed in accordance with another embodiment of my invention, the camera being withdrawn for use;

Figure 7 is a view in rear elevation of the assembly as illustrated in Figure 6;

Figure 8 is a sectional view taken substantially on the line 8—8 of Figure 7, the camera being in end elevation;

Figure 9 is an enlarged detailed sectional view taken substantially on the line 9—9 of Figure 8;

Figure 10 is a sectional view taken substantially on the line 10—10 of Figure 8;

Figure 11 is a view in top plan of the case, the camera being omitted.

In the embodiment of my invention as illustrated in Figures 1 to 5 inclusive, A denotes a case which snugly houses a camera C when such camera is not in use. The case A has one side face open whereby the camera may be retracted as desired from within the case when it is desired to use the camera. A front end wall 1 of the case A has disposed therethrough a suitably positioned opening 2 in which is fitted in a conventional manner a finder lens 3. This lens 3 is closely matched with the lens 4 of the camera C so that the lenses 3 and 4 are identical in all respects as nearly as possible. The lens 3, however, does not have a shutter mechanism associated therewith as there is no need for the same.

The lens 3 projects its rays upon a focusing or finder screen 5. This screen 5 when in effective position is spaced a required distance from the lens 3 so that the image projected upon the screen 5 will be duplicate as to location and as to all of its details of the image that is formed upon the sensitized film or kindred element within the camera C at the instant the lens 4 of the camera is opened.

The front wall 1 and the rear wall 6 have their marginal portions defining the open side of the case A inwardly thickened, as at 7, to provide stop shoulders 8 with which contact the end marginal portions of a plate 9 against which the camera C is held. This contact of the plate 9 with the shoulders 8 limit the outward movement of the camera C when the same is withdrawn from within the case A for use. This outward movement of the camera C is sufficient of course to allow the lens 4 of the camera to come into the open or be uncovered for use.

The plate 9 at the opposite end portions thereof rigidly carries the outstanding skeleton frames 10 each including an outer transverse bar 11 provided with a notch 12 for a purpose to be hereinafter referred to. The camera C substantially snugly fits between the frames 10 and said camera in the present embodiment of the invention has close contact with the base flanges 14 of the frames 10 and which base flanges are welded or otherwise fixedly anchored to the plate 9 for securing the frames 10 in desired position.

The frames 10 are of a length to extend across the adjacent walls 15 of the camera and interlocking, as at 18, with the cross members 11 of the frames 10 is a cross bar 17 whereby the camera C is effectively held between the frames 10 and to the plate 9. The application of the bar 17 is materially facilitated due to the inherent resiliency of the frames 10 and each end portion of the bar 17 is provided with a laterally disposed lug 18 which extends within a notch 12. The outer face of each of said lugs is provided with a recess 19 which receives the portion of a cross member 11 immediately adjacent to and inwardly of the notch 12. While I have found the use of the frames 10 and the bar 17 to provide a convenient and effective means for holding the camera C to the plate 9, yet it is to be stated that other means for such attachment may be employed with equal advantage.

The side marginal portions of the plate 9 have disposed therealong and suitably secured thereto the strips 20 of felt or kindred material which have close contact with the adjacent walls 21 of the case A to provide means to prevent ingress of light within the inner portion of the case A when the camera is withdrawn for use.

In the present embodiment of my invention the focusing or finder screen 5 is carried directly by the plate 9 and is hingedly connected thereto, as at 22. When the case A and camera C are relatively moved to bring the plate 9 into contact with the shoulders 8, the screen 5 may be readily caused to swing outwardly across the inner portion of the case A as particularly illustrated in Figures 4 and 5 so as to be in proper position to receive thereon the light rays or image projected by the lens 3. The outward swinging movement of the screen 5 is limited by the contact of such screen with the inwardly disposed shoulder 23 herein disclosed as carried by the wall 24 opposed to the open face of the case A. When the screen 5 is in its full open or operative position it is maintained in such position by sliding inwardly a movable latch 25.

The screen 5 is of such material, preferably translucent, to enable the image projected on the screen 5 by the lens 3 to be readily viewed by the user through the large rectangular opening 26 provided in the rear end wall 6 of the case A and beyond which the camera C passes when such camera C is in its outer position with respect to the case A. The screen 5 has produced thereon perpendicularly related center hair lines 27 to facilitate the focus finding.

When the camera is not in use the latch 25 will be moved outwardly to allow the screen 5 to swing toward and in a position closely adjacent to the plate 9 thus permitting the camera C to be housed within the case A upon requisite movement of the case A and camera C one toward the other.

When the camera C is housed within the case A it is of advantage to provide means to hold the camera in such position. As particularly illustrated in Figure 5 of the drawings, the plate 9 is provided with an opening or socket 28 into which threads a holding screw 29 disposed through and rotatably held by the wall 24 of the case A.

In the embodiment of the invention as illustrated in Figures 6 to 11, the case B is of a character used in connection with a well known candid type of camera D. In this embodiment of my invention the top wall 31 of the case B is formed to provide buttonhole slots 32 in each of which engages a headed member 33 depending from the bottom wall of the camera D after said camera has been withdrawn from within the case B and is to be positioned in proper assembly with respect to the case B to facilitate the desired focus finding.

The front wall 34 of the case B is provided with an opening 35 having associated therewith the lens 36. This lens 36 is carefully matched with the lens 37 of the camera D so that the image projected by the lens 36 upon the screen 38 will be a duplicate as to location and as to all of its detail of the image recorded on the light sensitive film or kindred element of the camera D when the lens 37 is opened.

The screen 38 is also of a material, preferably translucent, to permit the user to observe the image of the screen 38 through the relatively large opening or window 39 provided in the rear wall 40 of the case B. The screen 38 is also provided with the perpendicularly related hair lines.

The screen 38 as herein disclosed is comprised in a structure including a holding bracket 41 extending upwardly from a slide plate 43 resting on the bottom wall 44 of the case B. This plate is provided with the transversely spaced depending flanges 45 which are directed through parallel slots 46 provided in the bottom wall 44 of the case B. The outer margins of these flanges 45 are connected by a cross plate 47. This cross plate 47 carries a depending button 48 which is exteriorly of the case B and which button provides means whereby the screen 38 may be readily moved into desired working or focus finding position or moved into a position closely adjacent to the rear wall 49 of the case B so that said screen 38 will offer no hinderance or obstruction to the placing or housing of the camera D within the case B. When the screen 38 is at the limit of its movement away from the back wall 49 of the case B it is in proper focus finding position.

From the foregoing description it is thought to be obvious that a case for a camera constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A case for slidably receiving a camera as a unit free of connection with said case, said case having one wall provided with a lens projecting its rays inwardly of the case, said lens being closely matched with the lens of the camera to be housed within the case, and a focusing screen carried by and within the case, said screen being so mounted and positioned to have the lens of the case project thereon, when the camera has been withdrawn from the case, an image substantially duplicate as to location and as to all of its detail of the image recorded on the light sensitive element of the camera at the instant the lens of the camera is opened, the mounting of the screen within the case providing means to allow the screen to move into a position to permit the camera to be housed within the case without hindrance by the screen, a second wall of the case having an opening to allow the user to observe the image on the screen.

2. A case for slidably receiving a camera as a unit free of connection with said case, said case having one wall provided with a lens projecting its rays inwardly of the case, said lens being closely matched with the lens of the camera to be housed within the case, and a focusing screen carried by and within the case, said screen being so mounted and positioned to have the lens of the case project thereon, when the camera has been withdrawn from the case, an image substantially duplicate as to location and as to all of its detail of the image recorded on the light sensitive element of the camera at the instant the lens of the camera is opened, the mounting of the screen within the case providing means to allow the screen to move into a position to permit the camera to be housed within the case without hindrance by the screen, a second wall of the case having an opening to allow the user to observe the image on the screen, the screen being translucent and the second wall of the case having the opening being opposed to the wall of the case having the lens.

HENRY FITZ.